United States Patent [19]

Marshall

[11] 4,208,652
[45] Jun. 17, 1980

[54] METHOD AND APPARATUS FOR IDENTIFYING IMAGES

[75] Inventor: Robert Marshall, Clinton, Iowa

[73] Assignee: A. C. Nielsen Company, Northbrook, Ill.

[21] Appl. No.: 942,467

[22] Filed: Sep. 14, 1978

[51] Int. Cl.² ............................................. G06K 9/00
[52] U.S. Cl. ................... 340/146.3 Y; 340/146.3 AG
[58] Field of Search ............ 340/146.3 BY, 146.3 CA, 340/146.3 AC, 146.3 R, 146.3 AG; 235/92 PC

[56] References Cited

U.S. PATENT DOCUMENTS

| | | | |
|---|---|---|---|
| 3,165,718 | 1/1965 | Fleisher | 340/146.3 Y |
| 3,705,383 | 12/1972 | Frayer | 340/146.3 CA |
| 3,932,839 | 1/1976 | Stephens | 340/146.3 R |
| 4,075,604 | 2/1978 | Degasperi | 340/146.3 B |

OTHER PUBLICATIONS

Buyle—Bodin et al., "A Letter Encoder After Analysis of Geometrical Char.", Proc. of Conf. on Machine Perception of Patterns, England, 4-1972, pp. 216–222.

*Primary Examiner*—Leo H. Boudreau
*Attorney, Agent, or Firm*—Mason, Kolehmainen, Rathburn & Wyss

[57] ABSTRACT

A method and apparatus for identifying images having different spatial characteristics divides the image into a predetermined number of image elements, determines whether each of the image elements is relatively light or relatively dark and assigns a white designation or a black designation to each image element as a result of this determination. The number of white designated and black designated image elements are counted, as are the number of like designated image elements adjacent to each image element. The counts thus obtained are compared with corresponding counts resulting from known images, and the image is identified when a match within a predetermined tolerance is found.

27 Claims, 5 Drawing Figures

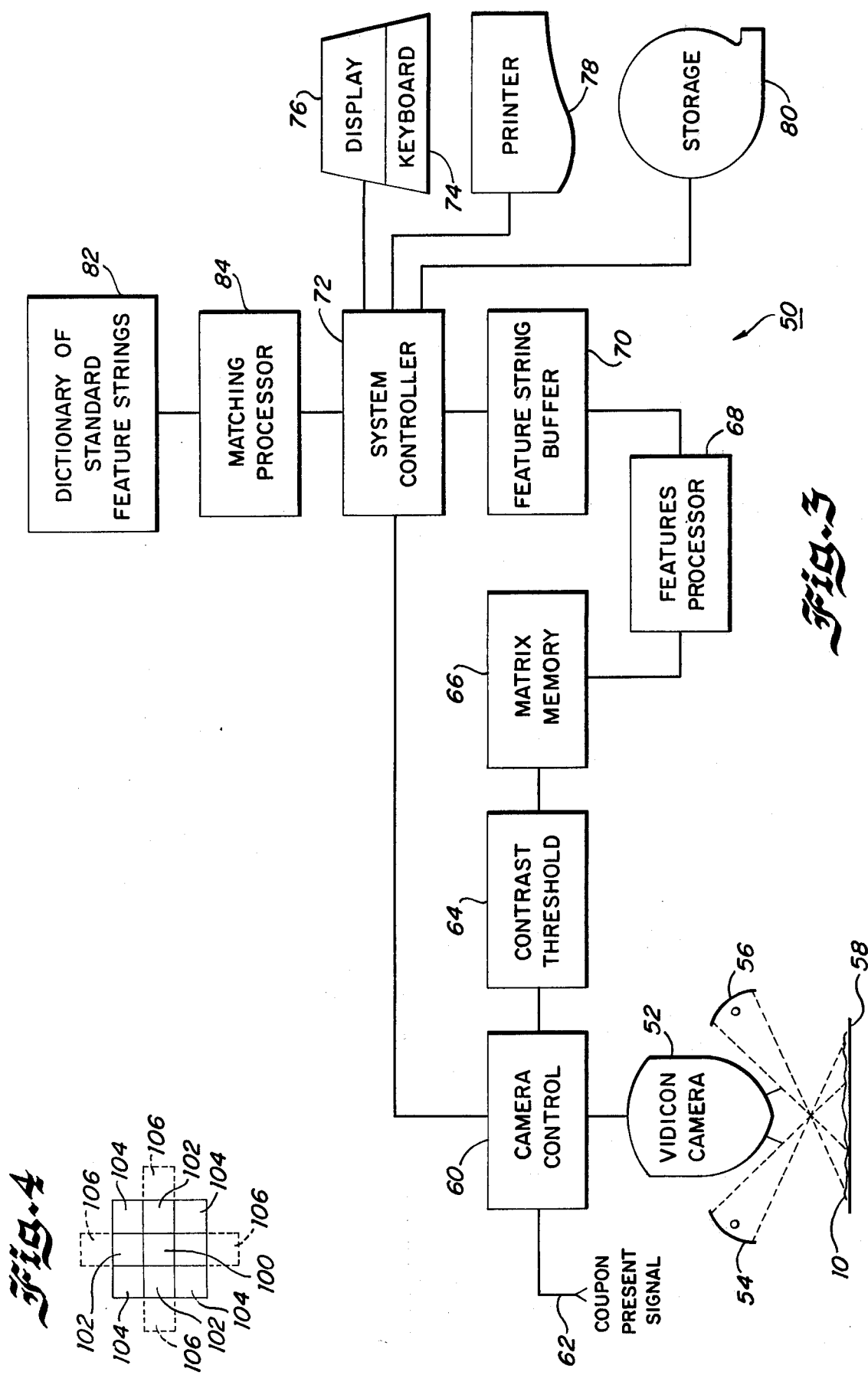

DICTIONARY ARRANGEMENT

| FEATURE | $1^T$ | $1^0$ | $1^1$ | $1^2$ | $1^3$ | $1^4$ | $0^T$ | $0^0$ | $0^1$ | $0^2$ | $0^3$ | $0^4$ | IDENTIFYING NUMBER | VALUE |
|---|---|---|---|---|---|---|---|---|---|---|---|---|---|---|
| FRONT FACE | 141 | 6 | 15 | 82 | 28 | 10 | 643 | 3 | 11 | 84 | 142 | 403 | 00001 | 0015 |
| BACK FACE | 90 | 1 | 2 | 19 | 42 | 26 | 694 | 2 | 5 | 7 | 156 | 518 | 00001 | 0015 |
| VARIATIONS DUE TO MUTILATION OR BLEMISHES | 145 | 1 | 9 | 67 | 58 | 10 | 639 | 0 | 5 | 44 | 221 | 369 | 00001 | 0015 |
| | 146 | 8 | 21 | 77 | 28 | 12 | 638 | 4 | 17 | 72 | 166 | 379 | 00001 | 0015 |
| | 142 | 0 | 16 | 74 | 44 | 8 | 642 | 1 | 11 | 52 | 202 | 376 | 00001 | 0015 |
| FRONT FACE | | | | | | | | | | | | | 00002 | 0020 |
| BACK FACE | | | | | | | | | | | | | 00002 | 0020 |
| VARIATIONS DUE TO MUTILATION OR BLEMISHES | | | | | | | | | | | | | 00002 | 0020 |
| | | | | | | | | | | | | | 00002 | 0020 |
| FRONT FACE | | | | | | | | | | | | | 00003 | 0012 |
| BACK FACE | | | | | | | | | | | | | 00003 | 0012 |
| VARIATIONS DUE TO MUTILATION OR BLEMISHES | | | | | | | | | | | | | 00003 | 0012 |
| | | | | | | | | | | | | | 00003 | 0012 |
| | | | | | | | | | | | | | ETC. | |

Fig.5

METHOD AND APPARATUS FOR IDENTIFYING IMAGES

BACKGROUND OF THE INVENTION

1. Field of the Invention

This invention relates generally to image processing systems, and more particularly, to an image processing system for analyzing contrast and spatial frequency features in order to identify an image.

2. Description of the Prior Art

Image identifying systems are known. Such systems range from feature following systems that analyze the contour of a particular feature to systems that detect the gross features of a document, such as size, color, luminescence, density and spectroscopic features. While such systems provide a way to identify images, the feature following systems are orientation dependent, and as such, require either proper orientation of the image, or orientation compensating circuitry. The requirement for proper orientation or orientation compensating circuitry reduces the speed with which a document can be read, and the accuracy of identification is substantially reduced when proper orientation or orientation compensation circuitry is not used.

Systems utilizing gross feature analysis for identification do not require proper orientation or orientation compensating circuitry; however, no single gross feature provides sufficient information to distinguish a particular image from more than a relatively small number of images. Thus, in order to distinguish a particular image from a relatively large number of images, several gross features must be analyzed. The analysis of several gross features may be done in cascade with, for example, size, luminescense, reflectivity, and color features being serially analyzed to identify a coupon, as described in copending U.S. patent application Ser. No. 872,359, filed on Jan. 26, 1978 by the present inventor. The aforesaid application issued as U.S. Pat. No. 4,166,540 on Sept. 4, 1979. Such serial analysis increases the accuracy of identification, and identification may be made before all of the gross characteristics are analyzed; however, such systems are relatively expensive because they require a separate analyzer for each gross characteristic being analyzed. Moreover, when a large number of images are processed, more characteristics must be analyzed, and the number of analyzers must be further increased. This further increases the cost of the system, both in terms of the number of analyzers that must be employed and the cost of the computer system required to analyze the results of a large number of analyses.

SUMMARY OF THE INVENTION

Accordingly, it is an object of the present invention to provide an improved image recognition system that overcomes many of the disadvantages of the prior art systems.

It is yet another object of the present invention to provide an image processing system that does not require a document to be accurately oriented prior to identification.

It is still another object of the present invention to provide an improved image processing system that permits an image to be recognized in a single scanning step.

It is yet another object of the present invention to provide an improved image processing system that does not require color information for identification purposes, and is capable of scanning both black and white and multicolored documents.

In accordance with a preferred embodiment of the invention, the image of a document is segmented into a matrix of discrete image elements. Each image element is analyzed in order to determine whether that element is more black or more white, and is assigned a black designation or a white designation in accordance with the results of the analysis. Each element is then compared with the elements adjacent thereto to determine the number of elements of like characteristic adjacent to each such element. The total number of white designated elements and the total number of black designated elements are counted, as are the number of elements of each characteristic having one, two, three and four like designated elements adjacent thereto. The above totals of black and white designated elements, as well as the totals representing elements of each characteristic having one, two, three and four like elements adjacent thereto are combined to form a feature string that is compared with feature strings of known documents stored in a dictionary memory. When a match within a predetermined tolerance is found, the document is identified.

BRIEF DESCRIPTION OF THE DRAWING

These and other objects and advantages of the present invention will be better understood with reference to the following detailed description and attached drawing, wherein:

FIG. 1 is an illustration of the face of a merchandise coupon to be identified by the method and apparatus according to the invention;

FIG. 2 is a representation of the designations assigned to various elements of the coupon of FIG. 1 by the method and apparatus according to the invention;

FIG. 3 is a block diagram of the image processing system according to the invention;

FIG. 4 is a partial representation of a matrix of image elements illustrating an alternative method of identification; and FIG. 5 is a graphic representation of feature strings stored in the dictionary memory.

DETAILED DESCRIPTION OF THE PREFERRED EMBODIMENT

Referring now to the drawing, with particular attention to FIG. 1, there is shown an image to be identified by the system according to the invention. The image illustrated in FIG. 1 contains only black and white shades in order to aid in the understanding of the invention, but it should be understood that images containing various shades of gray as well as various colors can be successfully scanned by the system. Moreover, in the embodiment shown in FIG. 1, the image is disposed on a merchandise coupon 10; however, images disposed on other documents, such as checks, magazine covers, stock certificates, bonds or other documents can also be identified by the system. Also, the image to be identified can be the image of a three-dimensional object projected onto a suitable focal plane, or can even be in the form of a video transmission, such as a television transmission.

The image of the coupon 10, as it appears after being partially processed by the system according to the invention, is illustrated in FIG. 2. In the illustration shown in FIG. 2, the coupon is placed in a segmented viewing field, and the relative lightness or relative darkness of the portion or element of the coupon image appearing in each segment is determined. If the image is being received as a video transmission, the transmission can be time segmented to provide the segmented viewing field, with the relative time of occurrence of each time segment defining its position in the viewing field. If the portion of the image appearing in a given segment is more dark than light, it is given a black designation and assigned a binary one value. If the element is more light than dark, it is given a white designation and assigned a binary zero value. Such designations are purely arbitrary, and the designations can be reversed, with a dark segment being assigned a binary zero value and a light segment being assigned a binary one value.

The elements located in the segments immediately adjacent to each such element are also analyzed, and the number of like designated elements immediately adjacent to each element is indicated by a superscript to the binary digit that indicates whether the element is light or dark. Thus, $0^0$ would indicate a white designated element with no other white designated elements in contact with it, and $0^1$, $0^2$, $0^3$ and $0^4$ would indicate white designated elements with 1, 2, 3 and 4 white designated adjacent elements, respectively. Similarly, $1^0$ would indicate a black designated element with no adjacent black designated elements and $1^1$, $1^2$, $1^3$ and $1^4$ would indicate black designated elements with 1, 2, 3 and 4 black designated adjacent elements, respectively. The assignment of the superscript value is also arbitrary and a binary one or a binary zero can be used to represent one type of adjacent element such as a light or dark element, or a like or unlike adjacent element, as long as consistency is maintained.

The designations for the coupon shown in FIG. 1 are illustrated in FIG. 2 within a dashed line that represents the outline of the coupon. The designations outside the dashed line result from a scanning of the background. The designation of many of the background elements have been eliminated for purposes of clarity since all of the background designations spaced more than one element from the dashed line are identical.

In the example shown in FIG. 2, a seven inch by seven inch field of view is used with a basic resolution of 0.025 inch by 0.025 inch for each picture or image element (pixel) to give a matrix of 28 by 28 elements; however, a vidicon camera such as the Hamamatsu C1000 camera can provide a matrix of 1024 by 1024 elements with a basic resolution of 0.007 inch by 0.007 inch, and the illustration of FIG. 2 is used to illustrate general principles only. It should also be noted that the white and black designations are somewhat arbitrary, since in a practical system, the output of the vidicon camera would be an analog signal and the white or black designations would be determined by whether the analog signal is above or below a predetermined slicing level as each element is scanned. Also, the representation of the coupon illustrated in FIG. 2 is viewed on a light background so all picture elements that do not intercept the image of the coupon are designated as $0^4$. The choice of the background color is also somewhat arbitrary, and a dark background can be used to generate $1^4$ designations for all elements not intercepting the image of the coupon. In either case, the number of $0^4$ or $1^4$ elements produced by the light or dark backgrounds, respectively, can be used to provide an approximate indication of the size of the coupon.

In a practical system, the matrix used to identify the image would contain from 256 by 256 to 512 by 512 elements (approximately 65,000 to 262,000 elements) for a medium resolution system to 1024 by 1024 (approximately 1,000,000 elements) for a fine resolution system. Such resolution would require the handling of 65,000 to 1,000,000 bits of information for every image scanned, and the handling of such large quantities of information would not result in a practical system. However, in accordance with an important aspect of the invention, it has been found that the distinctive features of an image are retained when the ten different adjacency categories previously described are summed, and that the sums of the different adjacency categories as well as the number of white and black designated elements provide a twelve category feature string that defines the image. The twelve categories of features are defined as follows:

SUM $1^T$ is defined as the total number of black designated elements present in the image;

SUM $0^T$ is defined as the total number of white designated elements present in the image;

SUM $1^0$, SUM $1^1$, SUM $1^3$ and SUM $1^4$ are defined as the total number of black designated elements having 0, 1, 2, 3 and 4 black designated elements adjacent thereto, respectively; and SUM $0^0$, SUM $0^1$, SUM $0^2$, SUM $0^3$ and SUM $0^4$ are defined as the total number of white designated elements having 0, 1, 2, 3 and 4 white designated elements adjacent thereto, respectively.

Thus, the data defining the image has been compressed into a feature string consisting of only twelve numbers that define the image. For the image illustrated in FIG. 2, the twelve number feature string defined by SUM $1^T$, SUM $1^0$, SUM $1^1$, SUM $1^2$, SUM $1^3$, SUM $1^4$, SUM $0^T$, SUM $0^0$, SUM $0^1$, SUM $0^2$, SUM $0^3$ and SUM $0^4$ is 108, 1, 15, 46, 43, 3, 676, 2, 10, 27, 199 and 438, respectively.

A block diagram of a scanning system according to the invention is illustrated in FIG. 3. The system, generally designated by the reference numeral 50, comprises a television camera such as a vidicon camera 52 or a solid state camera employing charge coupled devices, or the like, which is focused on the coupon 10. The coupon 10 is illuminated by a pair of light sources 54 and 56 and supported by a transport mechanism such as a belt 58.

A camera control circuit 60 is connected to the camera 52 and provides horizontal and vertical scanning for the vidicon camera 52. The camera control circuit 52 begins the scanning process when a signal indicating that a coupon is present is applied to a control line 62. Such a signal may be obtained, for example, from the vidicon camera 52, from a photoelectric detector, or from a sensor within the transport mechanism. The camera control circuit 60 may also include video amplifiers for raising the level of the video signal from the vidicon camera to a level compatible with a contrast threshold circuit 64.

The purpose of the contrast threshold circuit 64 is to convert a time varying analog signal from the camera control circuit 60 that is representative of the various shades of gray present in the scanned coupon 10 to a digital signal representative of a black designation or of a white designation. A video slicer which compares the amplitude of the analog signal from the camera control circuit 60 with a predetermined threshold level is suitable for this process. Several such video slicers are commercially available, including a unit manufactured by Hamamatsu that is designed for use with the Hamamatsu C1000 Vidicon Camera. The contrast threshold circuit 64 provides, in the present embodiment, a binary one level signal at its output when the analog signal from the camera threshold circuit 60 exceeds the predetermined threshold level and a binary zero level signal when the analog signal from the camera control circuit 60 is below the predetermined threshold level. Thus, the video signal from the vidicon camera 52 is quantized into a digital signal with each scanned portion of the coupon 10 being assigned a digital one or a digital zero, representative of a black designation or a white designation, depending on the relative lightness or darkness of the particular portion of the coupon being scanned.

The quantized signal from the contrast threshold circuit 64 is then applied to a matrix memory 66 which successively samples and stores portions of the quantized signal representative of the various image elements. The capacity of the matrix memory 66 is determined by the desired system resolution, for example, for a 512 by 512 element system, a 64k byte (8 bit bytes) memory is required, while for a 1024 by 1024 element system a 128k byte memory is required. Preferably, the matrix memory 66 is a random-access memory, and can be built up from several 16k byte or 32k byte static random-access memories such as, for example, the 16k byte and 32k byte static memories built by Dynabyte, Inc., 4020 Fabian, Palo Alto, California.

A feature processor 68 is used to process the information stored in the matrix memory 66 and to reduce the mass of data stored in the matrix memory 66 to the feature string previously described. Thus, the feature processor 68 may be a hardwired microprocessor or a general purpose minicomputer programmed to count the number of zero bits and one bits stored in the matrix memory 66, and to count the number of like bits adjacent to each stored bit in order to generate the aforementioned twelve number feature string. A Zilog Z80A microprocessor or a North Star S-100 computer, which utilizes a Zilog Z80A microprocessor would be suitable for this purpose.

The output of the feature processor 68 is applied to a feature string buffer 70 which contains a memory having sufficient storage capacity to store several of the feature strings produced by the feature processor 68. The storage capacity is needed because the time required to obtain a match between a feature string and the stored known feature strings will vary depending on how many comparisons must be made before a match is achieved. Since each feature string contains only twelve numbers, a relatively small memory will suffice.

A system controller 72 provides overall clocking and control for the system 50. The system controller 72 also provides input and output capability for a keyboard input 74, a visual display, such as a cathode ray tube display 76, as well as outputs for permanent storage devices, such as, for example, for a printer 78 or a magnetic storage device, such as a disc or a tape 80. One such system usable as a system controller 72 is manufactured by Ohio Scientific, 11679 Hayden, Hiram, Ohio. This system also includes a data entry keyboard, a cathode ray tube display and a hard copy line printer.

A dictionary of standard feature strings 82 includes a memory capable of storing the feature strings of a large number of known images. As shown in FIG. 5, a feature string for the front face and back face of each coupon is stored in the memory. The storage of front and back side feature strings permits a coupon such as a newspaper coupon to be identified from either side. In addition to the nominal front face and back face feature strings, feature strings produced by torn, mutilated or blemished coupons may also be stored, particularly if certain types of tears, such as torn corners, or other blemishes occur rather frequently, or if such mutilations or blemishes result in a substantial change in the nominal feature string. An image identifying number that identifies the image corresponding to each feature string is also stored, and other information relating to the image, such as, for example, the value of a coupon, or other information may also be stored.

The feature strings can be generated by scanning a known coupon with the system and transferring the feature string thus obtained to the dictionary 82. The feature string for a known image or coupon may also be generated externally and entered into the dictionary 82 via the keyboard 74 or other suitable input device. Although the external methods of data generation and dictionary entry may be preferable when very high accuracy is required, the entry of data into the dictionary 82 can be made an automatic process by utilizing the system itself. Such automatic entry may be achieved by programming the system controller 72 to enter the data from the feature processor 68 into the dictionary 82 each time a match is not achieved. The system would also indicate to the operator via the display 76 that a match has not been achieved in order to permit the operator to enter the data necessary to identify the coupon manually via the keyboard 74. The automatic approach has the advantage that it simplifies data entry and reduces dictionary look-up time. The look-up time is reduced since statistically the most numerous coupons will be entered into the dictionary ahead of less numerous coupons, and a match will usually be achieved for the most numerous coupons by scanning only the initial entries of the dictionary.

Finally, a matching processor 84 is provided. The matching processor 84 may be a hardwired microprocessor whose only function is to look up the entries in the dictionary 82 and to attempt to match each entry with a feature string stored in the feature string buffer 70 within a predetermined tolerance. Various statistical methods, such as, for example, the least squares method, may be used to obtain a match to any desired degree of tolerance. A Zilog Z80A microprocessor is also suitable for use as the matching processor 84.

In the system described above, the feature string is defined in one particular way, however, many variations of the general idea can be used to compress the data in different formats to provide somewhat different feature strings. For example, if the total number of elements in the matrix is known, it is not necessary to determine both SUM $1^T$ and SUM $0^T$ since the provision of one of the aforesaid sums would automatically define the other. In this case, providing both SUM $1^T$ and SUM $0^T$ would provide redundant information. Also, in the data compression described above, the number of like designated elements surrounding each element are counted to define the various adjacency categories of the feature string; however, the same information can be obtained in a different format by counting the number of unlike designated elements surrounding each element. The numbers defining the features of the image would be different, but the information content would be the same.

Other variations on the basic pronciple are also possible. For example, although the comparison of a particular element with adjacent elements, as described in the above, has been found to provide adequate resolution for the identification of most images, in the case of highly complex images, and in cases where the various images to be scanned are similar to each other (regardless of complexity or lack thereof) greater resolution is required. To achieve required resolution, the number of elements in the matrix may be increased; however, to avoid such an increase in the number of elements, elements other than those immediately adjacent to each element may be considered in the identification process. For example, if an element 100 (FIG. 4) forms part of a complex image, in addition to counting the number of adjacent elements 102 of like designation surrounding the element 100, the corner elements 104 can also be considered. Such a consideration would result in eighteen adjacency categories, that is, $0^0$ through $0^8$ and $1^0$ through $1^8$ in addition to the SUM 1 and SUM 0 categories. Although the processing of a twenty-number feature string would require more computation time than the processing of a twelve-number feature string, greater system resolution would result. Thus, the system can be designed to provide a trade-off between speed and resolution.

If even greater resolution is desired, additional elements such as, for example, the alternate elements 106 may also be considered in determining the feature string. Although the inclusion of alternate elements, such as the element 106 in the feature string, would reduce computation time, even greater accuracy can be achieved. Thus, it is an advantage of the system that the pattern of elements that are included in the feature string can readily be tailored to suit the type of image being processed. The system is also applicable to three-dimensional images, since the elements included in the feature string need not all lie in a single plane.

In addition to utilizing the various numbers of the feature string to identify a particular image, the numbers of the feature string can be used to extract information defining the physical characteristics of the image, such as whether the image contains fine or coarse detail, large or small print, fine lines or thick lines, etc. These characteristics can be determined by noting the magnitude of certain ones of the numbers in the feature string. For example, thin lines generate high values of SUM $1^2$, and if closely spaced, high values of SUM $0^2$. Wide spaced thin lines generate high values of SUM $1^2$, SUM $0^3$ and very high values of SUM $0^4$. Large dark squares generate high values of SUM $1^4$ and moderate values of SUM $1^3$, but fine detail such as small rectangles generate high values of SUM $1^0$ and SUM $0^2$. Large print generates high values of SUM $0^4$ and SUM $0^3$, but small print generates high values of SUM $1^2$ and high SUM $0^2$. A solid border generates high SUM $1^4$ and high SUM $0^4$, but a border formed of rectangular bars generates high SUM $1^2$ and high SUM $1^3$. A small document on a light background generates high values of SUM $1^4$ and very high values of SUM $0^T$, while a large document on a light background gives low values of SUM $0^T$ and high values of SUM $1^T$. Other characteristics of documents also have individual characteristic features.

Although the system has been illustrated utilizing a black and white vidicon camera and a white light source to determine the relative lightness and darkness of the image elements when exposed to the white light source, colored light sources, colored filters or spectrally selective detectors may be utilized to determine the apparent lightness or darkness of the elements when exposed to light of a restricted frequency range or when viewed through a particular filter. Also, the light need not be in the visible range, and infrared or ultraviolet sources may be used, and the light source may be tailored to the particular type of documents being identified. Also, a color television camera, which is simply a combination of three black and white camers viewing the image through at least two filters, can also be used for documents having high color content. In this instance, the camers would supply signals representative of the relative lightness or darkness of the image as viewed through the filters. Other variations are also possible, such as the use of an ultraviolet source and a visible light camera for detecting the luminescence of a document, or for detecting "invisible" inks on a document. Again the cameras would provide signals representative of the lightness or darkness of the luminescence. The same principles apply regardless of the type of source or detector used.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A method for automatically identifying an image, comprising the steps of:

reading said image with a scanning device and segmenting said image into a plurality of image elements;

providing a signal representative of a predetermined characteristic of each image element;

assigning one of first and second designations to each image element in response to the value of the portion of the signal representative of that element and providing a first or second value signal representative of the designation of each image element;

automatically determining from said first and second value signals the number of image elements disposed in a predetermined spatial relationship about preselected ones of said image elements assigned said first designation that have a designation predeterminedly related to said first designation and providing a signal representative thereof;

automatically determining from said first and second value signals the number of image elements disposed in a predetermined spatial relationship about preselected ones of said image elements assigned said second designation that have a designation predeterminedly related to said second designation and providing a signal representative thereof;

automatically determining from said number representative signals one of a plurality of predetermined values for each of said preselected image elements representative of the designation of each preselected element and the number of said predeterminedly related image elements disposed thereabout and providing a count signal representative of the number of preselected image elements having each of said predetermined values; and utilizing the count signal to identify the image.

2. A method as recited in claim 1 wherein the step of utilizing the count signal includes the steps of comparing the count signal with count signals representative of known images and identifying the image when the count signal obtained from said image corresponds to the count signal representative of a known image within a predetermined tolerance range.

3. A method as recited in claim 1 wherein said predeterminedly related designation is a like designation.

4. The method recited in claim 1 further including the step of automatically determining from said first and second value signals the number of image elements assigned one of said first and second designations and providing a signal representative thereof, and said utilizing step further includes the steps of utilizing said designation representative signal to identify said image.

5. A method for automatically identifying an image, comprising the steps of:
   reading said image with a scanning device and segmenting said image into a plurality of image elements;
   providing a signal representative of the lightness or darkness of each image element;
   automatically determining from said signal whether each image element is relatively light or relatively dark and generating a light value signal representative of a light value image element or a dark value signal representative of a dark value image element for each image element in response to said determination;
   automatically determining from said light and dark value signals the number of light value image elements that have a predetermined number of one of said light value and dark value image elements disposed in a predetermined spatial relationship therewith and providing a signal representative thereof;
   automatically determining from said light and dark value signals the number of dark value image elements that have a predetermined number of one of said light value and dark value image elements disposed in a predetermined spatial relationship therewith and providing a signal representative thereof; and
   utilizing the number representative signals thus obtained to identify the image.

6. A method as recited in claim 5 wherein the step of utilizing the number representative signals includes the steps of comparing the number representative signals with respective number representative signals representative of known images and identifying said image when the number representative signals obtained from said image correspond to the number representative signals representative of a known image within a predetermined tolerance range.

7. A method as recited in claim 5 wherein the step of automatically determining from said light and dark value signals the number of light value image elements that have a predetermined number of one of said light value and dark value image elements disposed in a predetermined spatial relationship therewith includes the step of automatically counting the number of light value image elements that have a predetermined number of light value image elements disposed in a predetermined spatial relationship therewith, and wherein the step of automatically determining from said light and dark value signals the number of dark value image elements that have a predetermined number of one of said light value and dark value image elements disposed in a predetermined spatial relationship therewith includes the step of counting the number of dark value image elements that have a predetermined number of dark value image elements disposed in a predetermined spatial relationship therewith.

8. The method recited in claim 5 further including the step of automatically determining from said light and dark value signals the number of image elements assigned one of said light and dark values and providing a signal representative of the number thereof.

9. A method for automatically identifying an image, comprising the steps of:
   reading said image with a scanning device and segmenting said image into a plurality of image elements;
   providing a signal representative of the lightness or darkness of each image element;
   automatically determining from said signal whether each image element is relatively light or relatively dark and assigning a light value signal representative of a light value image element or a dark value signal representative of a dark value image element to each image element in accordance with said determination;
   automatically determining from said light and dark value signals the number of one of said light and dark value image elements and providing a signal representative thereof;
   automatically determining from said light and dark value signals the number of light value image elements having one light value image element adjacent thereto and providing a signal representative thereof;
   automatically determining from said light and dark value signals the number of image elements having two light value image elements adjacent thereto and providing a signal representative thereof;
   automatically determining from said light and dark value signals the number of light value elements having three light value elements adjacent thereto and providing a signal representative thereof;
   automatically determining from said light and dark value signals the number of light value elements having four light value elements adjacent thereto and providing a signal representative thereof;
   automatically determining from said light and dark value signals the number of dark value image elements having one dark value image element adjacent thereto and providing a signal representative thereof;
   automatically determining from said light and dark value signals the number of dark value image elements having two dark value image elements adjacent thereto and providing a signal representative thereof;
   automatically determining from said light and dark value signals the number of dark value image elements having three dark value image elements adjacent thereto and providing a signal representative thereof;
   automatically determining from said light and dark value signals the number of dark value image elements having four dark value image elements adjacent thereto and providing a signal representative thereof; and
   comparing the number representative signals thus obtained with stored number representative signals representative of known images and identifying said image when the number representative signals obtained from said image correspond to the stored number representative signals of a known image within a predetermined tolerance range.

10. A method as recited in claim 9 further including the steps of:
automatically determining from said light and dark value signals the number of light value image elements having one light value image element disposed in a corner-to-corner relationship therewith and providing a signal representative thereof;
automatically determining from said light and dark value signals the number of light value image elements having two light value image elements disposed in a corner-to-corner relationship therewith and providing a signal representative thereof;
automatically determining from said light and dark value signals the number of light value image elements having three light value image elements disposed in a corner-to-corner relationship therewith and providing a signal representative thereof;
automatically determining from said light and dark value signals the number of light value image elements having four light value image elements disposed in a corner-to-corner relationship therewith and providing a signal representative thereof;
automatically determining from said light and dark value signals the number of dark value image elements having one dark value image element disposed in a corner-to-corner relationship therewith and providing a signal representative thereof;
automatically determining from said light and dark value signals the number of dark value image elements having two dark value image elements disposed in a corner-to-corner relationship therewith and providing a signal representative thereof;
automatically determining from said light and dark value signals the number of dark value image elements having three dark value image elements disposed in a corner-to-corner relationship therewith and providing a signal representative thereof; and
automatically determining from said light and dark value signals the number of dark value image elements having four dark value image elements disposed in a corner-to-corner relationship therewith and providing a signal representative thereof.

11. A system for identifying an image comprising:
means for receiving a time varying electrical signal representative of said image;
means for successively sampling portions of said electrical signal and assigning one of first and second designations to each of said sampled portions, said first designation being assigned to those portions of said electrical signal having an amplitude greater than a predetermined reference and said second designation being assigned to those sampled portions having an amplitude less than said predetermined reference;
means for determining for preselected ones of said sampled portions the number of predeterminedly time related sampled portions that have a designation predeterminedly related to each preselected sampled portion and assigning a representation of said number to each of said respective ones of said preselected sampled portions; and
means for determining the number of said portions of said signal assigned one of said first and second designations, for determining the number of said portions of said signal assigned said first designation having assigned thereto a predetermined number of designations, and for determining the number of portions of said signal assigned said second designation having assigned thereto predetermined number representations in order to provide a feature string identifying said image.

12. A system for defining an image comprising:
means for receiving an electrical signal representative of said image;
means for sampling portions of said electrical signal representative of areas of said image and assigning one of first and second designations to each of said sampled portions, said first designation being assigned to those portions representative of areas of said image darker than a predetermined reference and said second designation being assigned to those sampled portions representative of areas of said image lighter than said predetermined reference;
means for determining for preselected sampled portions the number of sampled portions representative of areas of said image predeterminedly offset from the areas represented by each said preselected sampled portion that have a designation predeterminedly related to each preselected sampled portion and assigning a representation of said number to each of said respective ones of said preselected sampled portions; and
means for determining the number of said portions of said signal assigned one of said first and second designations, said determining means including means for determining the number of said portions of said signal assigned said first designation having a predetermined number of representation assigned thereto and for determining the number of portions of said signal assigned said second designation having a predetermined number representation assigned thereto in order to provide a feature string identifying said image.

13. A system for identifying an image comprising:
means for scanning said image and providing an electrical signal representative thereof;
means responsive to said electrical signal for providing a quantized signal having a first level when said scanning means is scanning a portion of said image that is lighter than a predetermined level and having a second level when said scanning means is scanning a portion of said image that is darker than said predetermined level;
means for sampling portions of said quantized signal representative of segments of said image;
means for selecting predetermined ones of said sampled portions of said quantized signal representative of segments of said image disposed in a predetermined spatial relationship about preselected ones of said segments, and for counting the number of said predetermined sampled portions having a level predeterminedly related to the levels of portions of said quantized signal representative of said preselected ones of said segments;
means responsive to said selecting means for assigning one of a predetermined number of values to each of said preselected segments in accordance with the level of the quantized signal representative of each respective preselected segment and the number of said sampled portions having said level predeterminedly related thereto, said assigning means further including means responsive to said values for providing a count representative of the number of said preselected segments assigned each of said values; and means responsive to said count for identifying said image.

14. A system as recited in claim 13 further including means for counting the number of sampled portions of said quantized signal having one of said first and second levels and providing an indication representative thereof, and wherein said identifying means further includes means responsive to said indication cooperating with said count responsive means for identifying said image.

15. A system as recited in claim 13 wherein said identifying means further includes means for storing counts representative of known images and means for comparing the count representative of said scanned image with said stored counts and providing an identification when the count of said scanned image corresponds to one of said stored counts within a predetermined tolerance.

16. A system for identifying an image comprising:
means for segmenting said image into a plurality of image elements;
means for analyzing a predetermined characteristic of at least some of said image elements and assigning one of first and second designations to each analyzed image element in response to the value of the predetermined characteristic of that element;
means for counting the number of image elements disposed in a predetermined spatial relationship about preselected ones of said analyzed elements assigned said first designation that have a designation predeterminedly related to said first designation, said counting means further including means for counting the number of image elements disposed in a predetermined spatial relationship about preselected ones of said analyzed elements assigned said second designation that have a designation predeterminedly related to said second designation;
means responsive to said counting means for assigning one of a predetermined number of values to each of said preselected elements representative of the designation of each respective preselected elements and the number of image elements having said predeterminedly related designation disposed thereabout, said assigning means further including means responsive to said values for providing a count representative of the number of said preselected elements assigned each of said values; and
means responsive to said count for identifying the image.

17. A system as recited in claim 16 wherein said predetermined characteristic analyzing means includes means for determining the relative lightness or relative darkness of each element in a predetermined frequency range and assigning a light designation or a dark designation to each element in response to the determination.

18. A system as recited in claim 17 wherein said counting means includes means for counting the number of light designated elements disposed in said predetermined spatial relationship about each of said preselected light designated elements and for counting the number of dark designated elements disposed in said predetermined spatial relationship about each of said preselected dark designated elements.

19. A system as recited in claim 17 wherein said counting means includes means for counting the number of dark designated elements disposed in said predetermined spatial relationship about each of said preselected light designated elements and for counting the number of light designated elements disposed in said predetermined spatial relationship about each of said preselected dark designated elements.

20. A system as recited in claim 16 further including means for counting the image elements assigned one of said first and second designations and providing a number indicative thereof, and wherein said identifying means includes means responsive to said number cooperating with said count responsive means for identifying said image.

21. A system as recited in claim 16 wherein said identifying means includes means for storing counts representative of known images and means for comparing the count representative of said segmented image with said stored counts and providing an identification when the count of said segmented image corresponds to one of said stored counts within a predetermined tolerance.

22. A system as recited in claim 16 wherein said counting means includes means for counting the number of elements having said predeterminedly related designation disposed adjacent to said preselected analyzed elements assigned said first and second designations, respectively.

23. A system as recited in claim 16 wherein said counting means includes means for counting the number of elements having said predeterminedly related designations disposed in a corner-to-corner relationship with said preselected analyzed elements assigned said first and second designations, respectively.

24. A system for automatically identifying an image comprising:
means for segmenting said image into a plurality of image elements;
means responsive to said segmenting means for determining whether each element is relatively light or relatively dark and assigning a light value or a dark value to each image element in response to the determination;
means for counting the number of light value image elements that have a predetermined number of one of said light value and dark value image elements disposed in a predetermined spatial relationship therewith;
means for counting the number of dark value image elements that have a predetermined number of one of said light value and dark value image elements disposed in a predetermined spatial relationship therewith; and
means responsive to said numbers for identifying said image.

25. A system as recited in claim 24 further including means for counting the number of image elements assigned one of said light and dark values cooperating with said utilizing means for identifying said image.

26. A system for automatically identifying an image comprising:
means for segmenting said image into a plurality of image elements;
means responsive to said segmenting means for determining whether each element has a first or second characteristic and assigning a first value or a second value to each image element in response to the determination;
means for counting the number of first value image elements that have a predetermined number of one of said first value and second value image elements disposed in a predetermined spatial relationship therewith;

means for counting the number of first value image elements that have a predetermined number of one of said first value and second value image elements disposed in a predetermined spatial relationship therewith; and means responsive to said numbers for identifying said image.

27. A system as recited in claim 26 further including means for counting the number of image elements assigned one of said first and second values cooperating with said utilizing means for identifying said image.

* * * * *

UNITED STATES PATENT AND TRADEMARK OFFICE
CERTIFICATE OF CORRECTION

PATENT NO. : 4,208,652

DATED : June 17, 1980

INVENTOR(S) : ROBERT MARSHALL

It is certified that error appears in the above—identified patent and that said Letters Patent are hereby corrected as shown below:

Column 15, claim 26, line 3, delete "first" and substitute --second--.

Signed and Sealed this

Seventeenth Day of November 1981

[SEAL]

Attest:

Attesting Officer

GERALD J. MOSSINGHOFF

Commissioner of Patents and Trademarks